United States Patent [19]

Coates et al.

[11] Patent Number: 5,357,527
[45] Date of Patent: Oct. 18, 1994

[54] VALIDATION OF RAM-RESIDENT SOFTWARE PROGRAMS

[75] Inventors: Thomas M. Coates, Portola Valley; John F. Schipper, Palo Alto, both of Calif.

[73] Assignee: Trimble Navigation Limited, Sunnyvale, Calif.

[21] Appl. No.: 999,160

[22] Filed: Dec. 31, 1992

[51] Int. Cl.$^5$ .............................................. G06F 11/10
[52] U.S. Cl. .................................. 371/37.4; 371/37.7
[58] Field of Search .................. 371/37.4, 37.6, 37.7, 371/35

[56] References Cited

U.S. PATENT DOCUMENTS

| | | | |
|---|---|---|---|
| 4,525,838 | 6/1985 | Patel | 371/37.4 |
| 4,680,764 | 7/1987 | Suzuki et al. | 371/37.5 |
| 4,716,566 | 12/1987 | Masuhara et al. | 371/37.7 |
| 4,716,567 | 12/1987 | Ito et al. | 371/37.2 |
| 4,748,628 | 5/1988 | Moriwaki | 371/37.7 |
| 5,068,857 | 11/1991 | Yoshida et al. | 371/37.7 |

*Primary Examiner*—Joseph Ruggiero
*Attorney, Agent, or Firm*—John Schipper

[57] ABSTRACT

A method for transmitting and verifying the accuracy of a software program, expressed as a stream of J bits.. A first forward error correction error coding, detection and correction (ECDC) procedure is applied to the program, where the first ECDC procedure is expressible as a stream of K1 error coding bits plus L1 additional bits representing the procedure for determining the values of the K1 bits and for detecting the presence of and correcting an error in the original stream of J bits plus the K1 error coding bits, as received by a recipient. A second ECDC procedure is then applied to the K1+L1 bits used in the first ECDC program, where the second ECDC procedure is expressible as a stream of K2 error coding bits plus L2 additional bits representing the procedure for determining the values of the K2 bits and for detecting the presence of and correcting an error in the (K1+L1)bits that represent the first ECDC procedure. This second ECDC procedure is applied to check the accuracy of transmission of the bits representing the first ECDC procedure, which is applied to the software program itself. The bit stream of J bits can be decomposed into 8 or 16 mutually exclusive subsidiary bit streams, to each of which the above error checking procedure is applied, to take advantage of certain kinds of error statistics that may be present.

10 Claims, 3 Drawing Sheets

VALIDATION OF RAM-RESIDENT SOFTWARE PROGRAMS

1. Field of the Invention

This invention relates to error checking of computer instruction streams and data that are transmitted to random access memory. or other instruction storage facilities.

2. Background of the Invention

Traditionally, a collection of instructions, such as a software program, that is to be used repeatedly is held in a permanent storage facility, such as read only memory (ROM) or the like, in order to assure the continued validity and non-corruptibility of the instructions and any ancillary data used to execute the instructions. The permanence of a ROM is both an advantage and a disadvantage: If one or more instructions must be modified, a new ROM must be constructed or burned in. This problem is lessened to some extent with the use of erasable and re-programmable ROMs (EPROMs), but erasure and reprogramming of portions of a ROM is often as arduous as programming the ROM ab initio. Further, if the original program is expanded substantially in size, the initial ROM or EPROM may no longer be large enough and may need to be replaced by a storage device with larger capacity, irrespective of the reprogramming features available. Further, the initial cost of a ROM or EPROM, its initial programming cost, and the cost of reprogramming an EPROM can be substantial.

If the instructions are transmitted from their source to another location for execution, one or more errors can occur in the instruction version received so that error detection and correction may be required. Twelve major sources of data communications errors are discussed by J. Fitzgerald, *Business Data Communications,* John Wiley & Sons, 1990, pp. 474–483, incorporated herein by reference. Fitzgerald also discusses six different approaches to error control: loop or echo error checking; error detection with retransmission; parity checking; M-out-of-N codes, polynomial error checking, including cyclic redundancy checks; and forward error correction procedures, including Hamming coding, Hagelberger coding, Bose-Chaudhuri coding and trellis coding.

The simplest error detection scheme, one- or two-dimensional parity check bits embedded in the transmitted signal, may be inadequate to identify the positions of the erroneous bit or bits in the received signal.

Richard Hamming, in "Error Detecting and Error Correcting Codes", Bell Sys. Tech. Jour., vol. 26, 1950, pp. 147–160, incorporated by reference herein, disclosed one of the earliest coding procedures for detection of single or double bit errors and correction of single bit errors in a bit stream. The Hamming method and the cyclic redundancy checking method are illustrated in W. Tomasi, *Electronic Communications Systems,* Prentice Hall, 1988, pp. 553–557. Hamming has received a U.S. patent on his error coding technique, No. 2,552,629, which illustrates certain logic arrangements that can be used to implement Hamming error coding of a word.

Abramson, in U.S. Pat. No. 3,163,848, characterizes the Hamming error coding technique as a modified parity check approach in which m different groups of data bit positions are formed and each such group has a parity number (0 or 1) assigned to that group. The data bit groups are chosen so that (1) each group has approximately the same number of bits therein and (2) for any two groups, a first group has at least two bit positions that differ from all the bit positions of a second group. Each Hamming error check bit then becomes a parity error check for the bit values in one of these groups. A knowledge of the group or groups where a parity error occurs allows the position of the single bit error to be determined directly. Abramson then develops a formalism that detects and corrects single bit errors and double bit errors, if the two erroneous bits positions are adjacent to each other. The bit positions for the (added) error check bits are arbitrary for the single bit Hamming error coding, but the bit positions for the Abramson error coding must be chosen precisely according to an algorithm involving complementary sequences of bit positions.

Srinivasan discloses arrangement of information bits into subsets, with a single error check bit being included in each subset, in U.S. Pat. No. 3,478,313. For example, a set of 36 information bits is divided into 9 partly overlapping sub-sets, each with 8 bits, including an error check bit.

Carter et al, in U.S. Pat. Nos. 3,648,239 and 3,697,949 and 3,949,208, disclose apparati for implementing single error correction, double error detection ("SEC DED"), using the Hamming approach or a variation thereof.

Apparatus for determining the Hamming distance of two binary words or vectors is disclosed by Conway in U.S. Pat. No. 3,656,109. The two words are analyzed by parallel operations, using full logical adders and subtractors.

Thacker et al disclose a high speed circuit for implementing Hamming error coding on medium to large size data fields, such as a data field with 32 kilobits (Kbits), in U.S. Pat. No. 4,276,647. It is assumed that bit errors, if they occur, occur in runs of length no more than, say, 11 or 12 bits. The data field is broken up into 16 (long) words of length 2 Kbits each, with word no. m containing the bits in positions $m$, $m+16$, $m+32$, $m+48$, $m+64$, etc. for $m = 0, 1, \ldots, 15$. Hamming error coding is applied to each of these 16 words separately, and a (consecutive) burst error of length M ($0 \leq M \leq 15$) will produce detectable and correctable single bit errors in each of M of these words.

Other procedures for forward error correction are discussed briefly by Fitzgerald, op. cit. Many of these techniques require elaborate coding and use a substantial number of error coding bits. As the number of error coding bits grows, the probability that one or more of these coding bits, or bits in the software used to implement this error coding, detection and correction procedure, may itself be erroneously transmitted.

Some workers in the field of error coding have applied two error coding approaches to part or all of the same data in order to increase the likelihood that a given error will be detected.

In U.S. Pat. No. 3,457,562, Fano discloses a sequential error coding approach that provides a sub-block of k information bits with n-k error check bits, then forms a new sub-block of k bits from k-1 of the former k information bits plus one new information bit (or new group of such bits), then determines a new set of n-k error check bits applicable to this new subblock of k information bits. The encoding and error checking thus works with partly overlapping sub-blocks, rather than with non-overlapping subblocks as in conventional ECDC, and each information bit is subjected to an ECDC procedure several times as the brackets enclosing the encoded information bits pass through the array of all information bits.

Patel, in U.S. Pat. No. 4,201,976, and Herron, in U.S. Pat. No. 4,870,645, disclose use of "cross-parity" coding in which pairs of eight-bit bytes, plus one parity bit at each end, are formed into a plurality of 18-bit columns. The parity bit at each of the two ends of a column is derived from first and second diagonal lines, not vertical lines or horizontal lines, of 16 data bits that cross each other but have no data bits in common. A parity bit for forward reading and a parity bit for backward reading are placed at the two ends of each such diagonal line, and the collection of data and error coding bits can be read and checked for errors in the forward or the backward direction. Each data bit is a member of two distinct diagonal lines, with +45° and −45° slopes so that each data bit has two parity checks applied thereto.

Sewerinson discloses a forward error correcting method that relies upon both coding and redundant message transmission, in U.S. Pat. No. 4,447,903. Two separate transmission channels carry redundant information. The first channel signal is encoded by EXclusively ORing, or otherwise combining, each bit with another message bit that is delayed by a constant time increment mat, where $(\Delta t)^{-1}$ is the channel bit rate and m is a positive integer. The second channel signal is similarly encoded with a corresponding time interval $n\Delta t$, or transmitted uncoded. The two channel signal are independently transmitted and decoded and then compared. This approach relies upon the fact that, if a bit error occurs in the first channel, the original bit position and the bit position m bits later are both erroneous so that determining the correct bit at each of these bit positions is relatively straightforward.

In U.S. Pat. No. 4,467,373, Taylor et al disclose use of parity checks computed in a first direction and check sums computed in a second direction to provide two-dimensional error coding and error detecting of pixel values used to construct a sequence of television screen images.

Two-level error coding is disclosed by de Couasnon in U.S. Pat. No. 4,486,881. A Fire code error check scheme and a parity check scheme are used to detect burst errors of short length and relatively long length, respectively.

Aichelmann et al, in U.S. Pat. No. 4,617,664, disclose use of a parity bit for each byte of an four-byte word plus use of four check bits, with each check depending upon two or more bits from each of the four bytes and each bit in each byte contributing to at least one of the four check bits. See FIG. 4 of this patent for one format of parity bits and check bits for a 32-bit data word. This provides a variation on .two-dimensional error coding of multibyte words.

A data transfer system, with two-level multibyte error detection and correction performed on variable length data transferred, is disclosed by Patel et al in U.S. Pat. No. 4,525,838. A data block is divided into sub-blocks, with each sub-block containing two or more interleaved primary code words, including $2t_1$ error check bytes for error detection and correction of $t_1$ errors at the first level. Within the block itself, $t_2$ additional error check bytes are included, for error detection and correction at the second level. After the first level error corrections are implemented, a syndrome or error indicia computed at the second level will be "zero" if the first level error corrections were properly applied. If errors still remain, the second level syndrome can detect and correct up to $t_2$ additional errors. Patel extends this approach in U.S. Pat. No. 4,706,250.

Furuya et al, in U.S. Pat. No. 4,644,544, discloses use of k+l+m+n error coding symbols or bits, where a first decoder and a second decoder examine n+k and l+m, respectively, of these bits for presence of an error in a transmitted message. Error correction uses information from both sets of error coding bits.

Use of a cross interleave Reed-Solomon error coding (CIRC) applied to upper and lower bytes in a plurality of n two-byte words is disclosed in U.S. Pat. No. 4,680,764, issued to Suzuki et al. A third Reed-Solomon error code, with approximately n redundant bits, is applied across the CIRC-encoded format to provide a second error check.

U.S. Pat No. 4,716,566, issued to Masuhara et al, discloses application of a first error detecting and correcting code plus a first parity bit to a message read out of memory, and application of a second error detecting and correcting code plus a second parity bit to the received message. If the two parity bits do not agree, the error correcting codes are applied to correct the message received.

Ito et al, in U.S. Pat. No. 4,716,567, disclose use of two distinct error detecting and correcting codes to the same block of data, for error check purposes. Each error coding, detection and correction (ECDC) code uses a string of error coding bits, and the bits of these two error coding strings are interleaved with each other and added to the original data block.

Moriwaki discloses application to a rectangular array of data bits of a first parity check (P series) in a vertical direction plus a second parity check in a diagonal direction (Q series), in U.S. Pat. No. 4,748,628. P series parity error checks and corrections and Q series parity error checks and corrections are alternated with each other to provide a variation of two-dimensional error coding, detection and correction of the data array. Similar error coding schemes are disclosed by Sako et al, in U.S. Pat. No. 4,780,178, by Tanaka et al, in U.S. Pat. No. 4,794,602, and by Schilling et al in U.S. Pat. No. 4,796,260.

An error check coding scheme for detecting and correcting errors in two or more data blocks read out of memory is disclosed by Debord et al in U.S. Pat. No. 4,961,193. An error check code, applied to three or more data blocks, produces a first syndrome or error indicia if an error (#1) occurs in a first block and an error occurs in a second block. and produces a second syndrome if an error (#2) occurs in the first block and an error occurs in a third block. The first and second syndromes are equal if the errors #1 and #2 are the same. The error coding, detection and correction procedure is applied to two or more data blocks at a time, such as to blocks 1 and 2 and to blocks 1 and 3.

Yoshida, in U.S. Pat. No. 5,068,857, discloses application to a data stream of two parallel error detection circuits, one circuit using CRC error checks and the other circuit using Reed-Solomon error checks. One or both of these circuits is activated, depending upon the characteristics of the data stream.

These workers were apparently not concerned with verifying the validity of one or the other of the error coding, detection and correction (ECDC) procedures themselves. The validity of an ECDC procedure is of concern where the data, instructions and that ECDC procedure are received by, and are merely temporarily resident in, a temporary storage apparatus for the software program, such as a random access memory. In such a situation, the bits representing an ECDC procedure are as likely to be received in error as are the bits representing the original data and instructions, because all such bits must be transmitted each time the software program is re-activated.

What is needed is a technique for transmitting a collection of computer instructions to a storage apparatus for subsequent use that allows prompt verification of the correcmess of the transmitted data and/or instructions and that allows rapid and relatively easy modification of any part, or all, of this collection, without requiting rework or replacement of the temporary storage apparatus. Preferably, the technique should allow unlimited increase or decrease of the size of the collection of data and/or instructions and should allow verification of the correcmess of the error coding bits as well.

SUMMARY OF THE INVENTION

These needs are met by the invention, which provides method and apparatus for transmitting and verifying the accuracy of a software program by use of layered error detection and correction procedures to sequentially verify the accuracy of a received bit stream. The technique begins with an initial software program, which may be a collection of instructions and ancillary data needed to execute or mn this program. This initial program is to be transmitted to a recipient that may be permanent memory, cache memory, random access memory or some other software storage facility.

This initial program is expressed as a continuous bit stream S1, with appropriate delimiters for the end of each instruction line if desired, and the number of "data" bits J in this stream (here, a collection of instructions) is determined. The bit stream S1 is augmented by a selected number K1 of additional bits for forward error correction (FEC) coding, where K1 is a positive integer. For example, if Hamming error checking is used, these K1 bits should satisfy the inequality $J \leq 2^{K1} - K1 - 1$. These K1 error check bits, with no bit values assigned as yet, are inserted at K1 selected bit positions in the original bit stream S1, thus producing a (J+K1)-bit stream S2. The bit values of the K1 error check bits are determined by a Hamming or other suitable FEC coding procedure P1. Error detection and correction using these K1 error check bits requires an FEC detection/correction procedure P2. The combined FEC procedures P1 and P2 form a first error coding, detection and correction (ECDC) procedure Q1 that requires a total of L1 bits for its expression. The first ECDC procedure Q1 plus the corresponding K1 error check bits form a bit stream S3 having K1+L1 bits.

The bit stream S3 is augmented by a selected number K2 of additional bits for FEC coding of the bit stream S3. These K2 error check bits, with no bit values assigned as yet, are inserted at K2 selected bit positions in the bit stream S3, thus producing a (K1+L1+K2)-bit stream S4. The bit values of the M error check bits are determined by a Hamming or other suitable FEC coding procedure P3. Error detection and correction using these K2 error check bits requires an FEC detection/correction procedure P4. The combined FEC procedures P3 and P4 form a second ECDC procedure Q2 that requires a total of L2 bits for its expression. The second ECDC procedure Q2 plus the K2 error check bits form a bit stream S5 having K2+L2 bits.

The second ECDC procedure, expressed by the bit stream S5, first verifies the accuracy of, or corrects, the bit stream S3. The first ECDC procedure, expressed by the bit stream S3, then verifies the accuracy of, or corrects, the original bit stream S1 having J data bits. The bit streams S1, S3 and S5 may be received by a random access memory or other memory apparatus, for temporary residence therein while the error coding, detection and correction operations are carried out. The original bit stream S1 is executed as the initial software program from the memory apparatus, after the correctness of the bit stream S1 is confirmed.

If the error statistics of the bit stream S1 are such that one or more bit errors only in an 8-consecutive-bit run, the bit stream can be decomposed into 8 mutually exclusive subsidiary bit streams, and an FEC approach that corrects a single bit error can be applied to each subsidiary bit stream separately. If the error statistics of the bit stream S1 are such that one or more bit errors occurs only in a 16-consecutive-bit run, the bit stream can be decomposed into 16 mutually exclusive subsidiary bit streams, and an FEC approach that corrects a single bit error can be applied to each subsidiary bit stream separately.

DETAILED DESCRIPTION OF THE INVENTION

Figure 1:
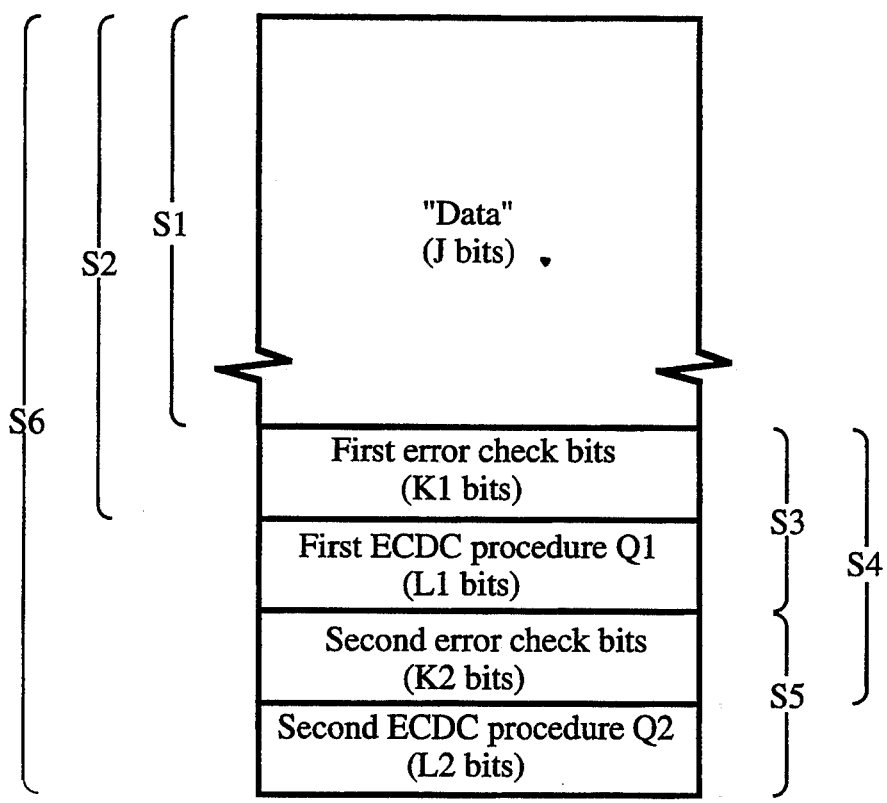
FIGS. 1 and 1A are schematic diagrams representing collections of bit streams used in two embodiments of the invention.

Consider an initial software program, including instructions and ancillary data needed to execute the program, which is to be transmitted to a recipient that is not identical with the source of, or storage facility for, this program. The initial software program is expressed as a consecutive stream S1 of bits, with end of line delimiters for each line of instructions or data if desired, as indicated in FIG. 1. The number J of bits in the bit stream S1 is then determined. The bit stream S1 is augmented by a selected additional number K1 of error check bits, where K1 is chosen according to the particular FEC procedure used. The number K1 of FEC error coding bits is usually orders of magnitude smaller than the number J of bits in the original bit stream. If, for example, the Hamming error check procedure is used, the number K1 must satisfy the inequality $J \leq 2^{K1} - K1 - 1$. For example, if J lies in the range $524,269 \leq N \leq 1,048,555$, the smallest number K1 that satisfies this inequality is K1=20. The K additional bits, with no bit values assigned as yet for these K1 bits, are inserted at K1 selected positions in the bit stream S1, thus producing a (J+K1)-bit stream S2, as in FIG. 1. Error check bit placement is arbitrary. For example, bit positions 1, 2, 4, 8, 16, etc. can be used, or the check bits may be placed at the end of the program.

The bit values of the K1 inserted bits are now determined by a suitable first forward error correction (FEC) procedure P1, such as the Hamming error coding procedure. This first FEC error coding procedure determines the values of the K1 error check bits and has an associated error detection and correction procedure P2. The combined first and second FEC procedures P1 plus P2 (of length L1), added to the K1 error coding bits, form a first error coding, detection and correction (ECDC) procedure Q1, which is expressible as a bit stream 53 having K1+L1 bits.

The accuracy of the K1+L1 bits used to augment the original bit stream S1 to form the bit stream S3 is verified by use of a second set of error coding bits (of bit length K2), a third FEC procedure P3, and a fourth FEC procedure P4. The combined procedures P3 plus P4 (of total bit length L2), added to the M error coding bits, form a second ECDC procedure Q2, which is expressible as a bit stream S5 having K2+L2 bits. The entire collection of bits forms a bit stream S6 of length J+K1+L1+K2+L2 bits, as indicated in FIG. 1. The first and second ECDC procedures Q1 and Q2 may be chosen independently from among a Hamming error check procedure, a check sum procedure, a Reed-Solomon procedure, a BCH procedure, or any other procedure that allows coding of a bit stream plus detection and correction of an error or errors in a bit stream. The bit stream S6 is then transmitted to a recipient.

The accuracy of transmission of the bit stream S3 is first verified or corrected by the second ECDC procedure Q2 (K2+L2 bits). The accuracy of transmission of the J "data" bits is then verified or corrected by the first ECDC procedure Q1 (K1+L1 bits). The following relations are expected to hold.

$$K1 << J \quad (1)$$

$$K2 \leq K1 \quad (2)$$

$$L2 \approx L1 \quad (3)$$

$$K2+L2 \leq K1+L1 << J. \quad (4)$$

This indicates that use of the second ECDC procedure bit stream S5 to verify the accuracy of, or correct, the tint ECDC procedure bit stream S3 can be done with relatively little cost, measured by the number of extra bits included for this purpose. For example, if the "data" size J is approximately 8 megabits, the number of error check bits K1 required for FEC coding of the data bits is about 23 (using Hamming error coding, for example), and the number of bits required to express the first ECDC procedure Q1 or the second ECDC procedure Q2 is less than 8 kilobits. The number of error check bits L2 required for FEC coding of the bit stream S3 is about 10-14. The number of bits required to verify the accuracy of the original J "data" bits is about 0.8 percent of the size of the data, and another 0.8 percent is treeder to verify that this verification procedure is also accurately expressed.

A third ECDC procedure, including associated error check bits, that verifies the accuracy of, or comets, the bit stream S5 could also be included in the bit stream transmitted to a recipient. However, if this third ECDC procedure is expressible as a bit stream, say S7, of length K3 error check bits plus L3 error coding, detection and correction procedure bits, the numbers K3 and L3 are expected to satisfy the following relations.

$$K3 \leq K2 \quad (5)$$

$$L3 \approx L2 \quad (6)$$

$$K3+L3 \leq K2+L2 \leq K1+L1 << J. \quad (7)$$

At this point, the law of diminishing returns becomes manifest. The bit stream S7 has about the same length as the bit streams S3 and S5, and the additional savings from inclusion of the bit stream S7 am probably too modest to pursue.

Figure 1A:
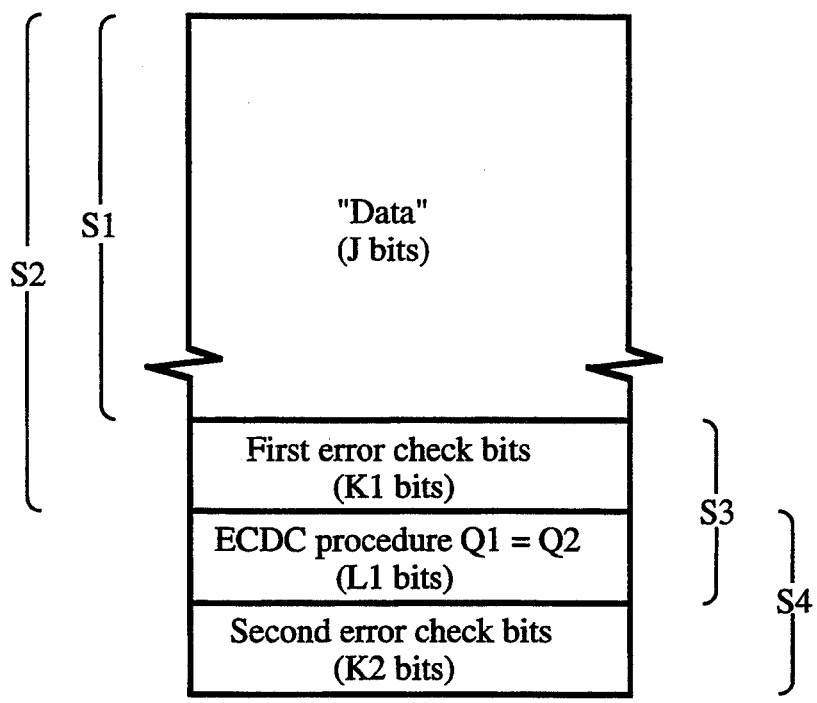

If the first ECDC procedure Q1 and the second ECDC procedure Q2 are the same (for example, both am Hamming, or both are Reed-Solomon), the bit expressions for Q1 and for Q2 are precisely the same, if "DO loops" of standardizable length arc used to analyze the bit length of a bit stream presented for analysis and to assign error check bits to this stream. This is easily done with Hamming error coding, detection and correction and appears to be straightforward with other ECDC procedures as well. Thus, the bit expression for the second ECDC procedure Q2 can use the bit expression already present for the first ECDC procedure Q1, thereby achieving a potential saving of L2 bits (L1=L2) through use of the Q1 bit expression for Q2 as well. If this is implemented, the bit stream format shown in FIG. 1 reduces to the bit stream format shown in FIG. 1A, and the total number of bits to be transmitted becomes J+K1+L1+K2, with $K2 \approx K1 << K1+L1 << J$.

Figure 2:
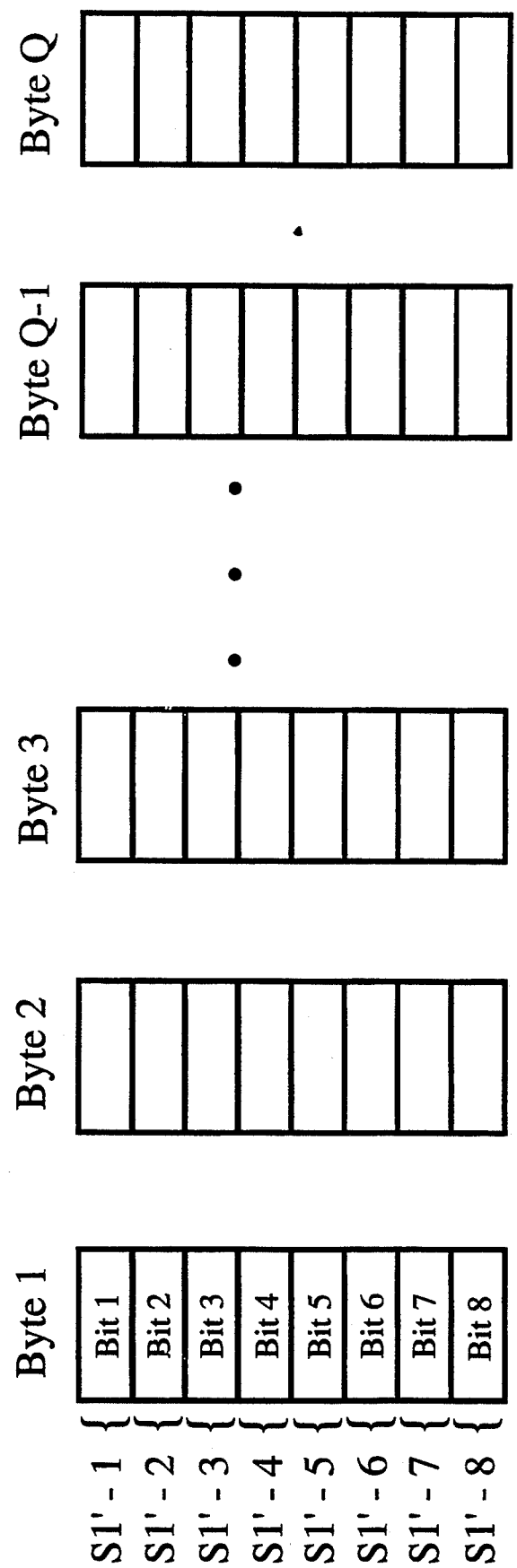
FIG. 2 is a schematic diagram illustrating decomposition of the original bit stream S1 when a single-byte error is to be detected and corrected.
Figure 3:
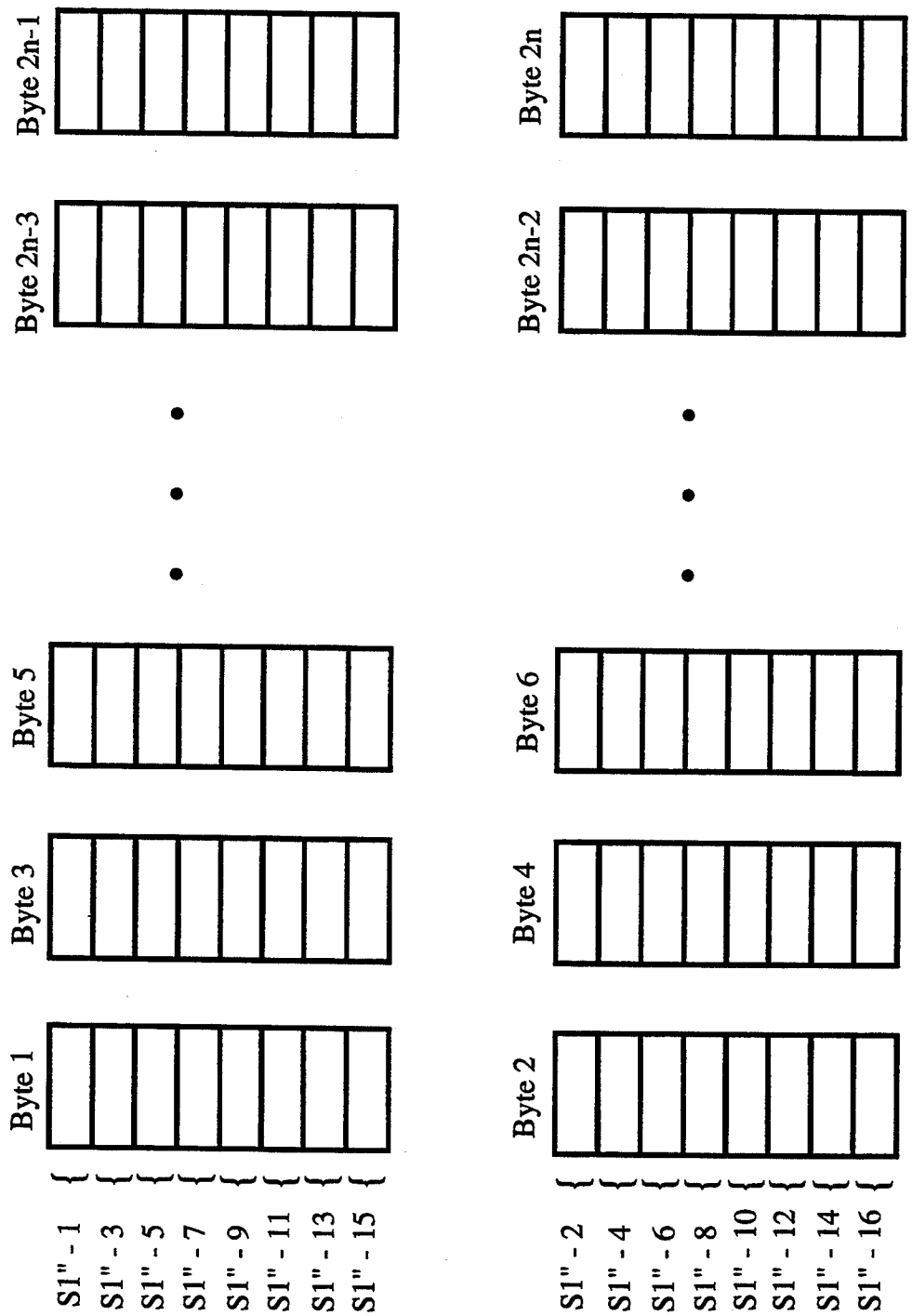
FIG. 3 is a schematic diagram illustrating decomposition of the original bit stream S1 when a double-byte error (errors occurring only in one or both of two.consecutive bytes) is to be detected and corrected.

The Hamming ECDC procedure uses the least possible number of error check bits (K1) to detect and correct an error in the original bit stream S1, but straightforward application of this procedure cannot correct more than a single bit error in the bit stream S1. If the error statistics of the bit stream S1 as received by the recipient are such that one or more errors occur only in a single 8-bit byte of the instructions in the initial software program, the bit stream S1 is reconstructed as follows before transmission. Eight subsidiary bit streams S1'-1, S1'-2, ..., S1'-8 are formed from the bit stream S1, with the bits in the subsidiary bit stream S1'-j (j=1, 2, ..., 8) being the ordered set of bits in position j of each eight-bit byte that is part of the initial software program (S1), as illustrated in FIG. 2. The subsidiary bit streams S1'-j (j=1, 2, ..., 8) are then transmitted separately, and the-Hamming or other ECDC procedure is then applied separately to each of these eight subsidiary bit streams. After corrections, if any, are applied to these eight subsidiary bit streams, as received by the recipient, these eight subsidiary bit streams are reassembled in a single bit stream that represents the initial software program bit stream S1 received by the recipient. The procedure set forth in this paragraph will be referred to as the "single-byte-error decomposition and reassembly procedure". The first ECDC procedure and the second ECDC procedure are successively applied to each of the bit streams S1'-j (j=1, 2, ..., 8) as discussed above.

Assume that the error statistics of the original bit stream (S1), as received by the recipient, are such that one or more errors occur only in two consecutive 8-bit bytes (referred to as a "double byte" herein) of the instructions in the initial software program. The bit stream S1 is reconstructed as follows before transmission. The original bit stream S1 includes 2n bytes with 16n bits, for some positive integer n, including at most one , "filler" byte, if necessary to obtain the 2n bytes. The bytes in this bit stream are consecutively numbered q=1, 2, 3, ..., 2n. Subsidiary bit streams S1''-1, S1''-2, ..., S1''-16 are formed, with the bits in the subsidiary bit stream S1''-(2j-1) (j=1, 2, ..., 8) being the ordered set of bits in position j of the odd-numbered bytes (q=1, 3, 5, ..., 2n-1) that are part of the bit stream S1''. The bits in the subsidiary bit stream S1''-2j (j=1, 2, ..., 8) are the ordered set of bits in position j of the even-numbered bytes (q=2, 4, 6, ..., 2n) that are part of the bit stream S1''. The subsidiary bit streams S1''-j (j=1, 2, ..., 16) are then transmitted separately, and the Hamming error detection and correction procedure or another suitable ECDC procedure is applied separately to each of these 16 subsidiary bit streams S1''-j (j=1, 2, ..., 16). After corrections, if any, are applied to these 16 subsidiary bit streams, as received by the recipient, these 16 subsidiary bit streams are reassembled in a single transmitted bit stream that represents the initial software program bit stream S1, as received by the recipient. The procedure set forth in this paragraph will be referred to as the "double-byte-error decomposition and reassembled procedure". The second ECDC procedure and the first ECDC procedure are successively applied to each of the bit streams S1''-j (j=1, 2, ..., 16) as discussed above.

The approach described here applies a first forward error correction ECDC procedure plus associated error check bits, expressed as a bit stream S3, to a bit stream S1 ("data") representing an initial software program. A second forward error correction ECDC procedure plus associated error check bits, expressed as a bit stream S5, is applied to the first forward error correction ECDC procedure to correct any errors contained, not in the "data" itself, but in the bit stream S3 used to express the first ECDC procedure. The bit stream S1 may have a length of the order of $n_1 = 5 \times 10^5$ bytes $= 4 \times 10^6$ bits. The bit stream S3 may have a length of the order of $n_2 = 10^3$ bytes $= 8 \times 10^3$ bits. The probability distribution for the number k of bit errors contained in a bit stream of length n is approximately a Poisson distribution, viz.

$$Pr[k;n] = \binom{n}{k} \lambda^k \exp(-\lambda)/k!, \quad (8)$$

where the mean or most probable number of errors k is given by $$K \approx \lambda \quad (9)$$

This defines the parameter $\lambda$. If the bit error rate is a and the length of a bit stream is B ($\gg 1$), the expected number of errors is approximately $$\epsilon B \approx k \approx \lambda, \quad (10)$$

and the probability of zero errors (k=0) in the bit stream of length B becomes $$Pr[k=0; B] = \exp(-\epsilon B) \quad (11)$$

In the invention disclosed here, the first bit stream ("data") typically has a length $B_1 \approx n_1 = 4 \times 10^6$ bits, and the second bit stream (first FEC procedure) typically has a length $B_2 \approx n_2 = 8 \times 10^3$ bits. If the bit error rate is $\epsilon \approx 10^{-7}$, the respective probabilities that one or more bit errors are present in the two bit streams become $$Pr[k \leq 1; B_1] = 1 - Pr[k=0; B_1] \approx 1 - \exp(-0.4) = 0.3297 \quad (12)$$

$$Pr[k \leq 1; B_2] = 1 - Pr[k=0; B_2] \approx 1 - \exp(-0.0008) = 0.0008. \quad (13)$$

Thus, the invention significantly reduces the probability that one or more errors will occur in the data bit stream or in the first ECDC procedure bit stream.

We claim:

1. A method for transmitting and verifying the accuracy of a software program transmitted to a recipient thereof, the method comprising the steps of:

receiving and storing a software program, expressed as an ordered set of J bits, that is to be transmitted;

expressing a selected first forward error correction, error coding, detection and correction (ECDC) procedure as an ordered set of L1 bits plus K1 associated error check bits, and applying this first ECDC procedure and associated error check bits to the set of J bits representing the software program;

expressing a selected second ECDC procedure as an ordered set of L2 bits plus K2 associated error check bits, and applying this second ECDC procedure and associated error check bits to the set of L1+K1 bits representing the first ECDC procedure;

transmitting the J bits representing the software program, the L1+K1 bits representing the first ECDC procedure, and the L2+K2 bits representing the second ECDC procedure; and applying the second ECDC procedure to the ordered set of L1+K1 bits to verify the validity of, or correct, these L1+K1 bits; and applying the first ECDC procedure to the ordered set of J bits to verify the validity of, or correct, these J bits.

2. The method of claim 1, further comprising the steps of choosing said second ECDC procedure to be identical to said first ECDC procedure and using said first ECDC procedure for operations requiring use of said second ECDC procedure.

3. A method for transmitting and verifying the accuracy of a software program transmitted to a recipient thereof, the method comprising the steps of:

receiving and storing a software program that is to be transmitted;

determining the number of consecutive bits J in the software program;

augmenting the J-bit stream by adding a selected number K1 of additional bits that serve as error check bits for a first error coding, detection and correction (ECDC) procedure, applied to the original J-bit stream;

assigning bit values to the K1 additional bits by applying the first ECDC coding procedure to the original J-bit stream;

inserting the K1 additional bits and associated bit values at K1 selected positions in the original stream of J bits to form a (J+K1)-bit stream;

augmenting the (J+K1)-bit stream by adding a selected number L1 of bits that implement the first ECDC procedure for the original J-bit stream, to form a (J+K1+L1)-bit stream;

augmenting the (J+K1+L1)-bit stream with a selected number K2 of additional bits that serve as error check bits for a second ECDC procedure, applied to the (K1+L1)-bit stream;

assigning bit values to the K2 additional bits by applying the second ECDC coding procedure to the (K1+L1)-bit stream;

inserting the K2 additional bits and associated bit values at K2 selected positions in the original J-bit stream to form a (J+K1+L1+K2)-bit stream;

augmenting the (J+K1+L1+K2)-bit stream by adding a selected number L2 of additional bits that implement the second ECDC procedure, applied to the (K1+L1)-bit stream, to form a (J+K1+L1+K2+L2)-bit stream;

transmitting the (J+K1+L1+K2+L2)-bit stream to a recipient of this bit stream;

verifying the accuracy of the K1+L1 bits of the first ECDC procedure, as received by the recipient, by applying the second ECDC procedure to these K1+L1 bits;

when an error is discovered in the K1+L1 bits of the first ECDC procedure bits, correcting this error, using the second ECDC procedure;

verifying the accuracy of the J bits of the software program, as received by the recipient, by applying the first ECDC procedure to these J bits; and when an error is discovered in the J bits of the software program, correcting this error, using the first ECDC procedure.

4. The method of claim 3, further comprising the step of choosing said K1 selected positions in said (J+K1)-bit stream to be the consecutively numbered bit positions for which the number is of the form $2^k$ ($k=0, 1, 2, \ldots, K1$).

5. The method of claim 3, further comprising the step of choosing said K1 selected positions in said (J+K1)-bit stream to be the consecutively numbered bit positions for which the number is of the form J+k ($k=1, 2, \ldots, K1$).

6. The method of claim 3, further comprising the step of choosing said first ECDC procedure to be the Hamming error check procedure, where said number K1 satisfies the inequality $J \leq 2^{K1} - K1 - 1$.

7. The method of claim 3, further comprising the step of choosing said second ECDC procedure to be the Hamming error check procedure, where said number K2 satisfies the inequality $L1 + K1 \leq 2^{K2} - K2 - 1$.

8. The method of claim 3, further comprising the steps of choosing said second ECDC procedure to be identical to said first ECDC procedure and using said first ECDC procedure for operations requiring use of said second ECDC procedure.

9. A method for transmitting and verifying the accuracy of a software program transmitted to a recipient thereof, the method comprising the steps of:

receiving and storing a software program as an ordered sequence of j 8-bit bytes;

forming eight bit streams S-1, S-2, ..., S-8 from the sequence of 8j bits, where bit stream S-h is an ordered sequence that includes bit number h of each of the j 8-bit bytes (h=1, 2, ..., 8);

applying the following procedure separately to each of the bit streams S-h (h=1, 2, ..., 8):

receiving and storing a bit stream S-h to be transmitted;

determining the number of bits j in this bit stream;

augmenting the j-bit stream by adding a selected number K1 of additional bits that serve as error check bits for a first ECDC procedure, applied to the original j-bit stream S-h;

assigning bit values to the K1 additional bits by applying the first ECDC procedure to the original j-bit stream S-h;

inserting the K1 additional bits and associated bit values at K1 selected positions in the stream S-h of j bits to form a (j+K1)-bit stream;

augmenting the (j+K1)-bit stream by adding a selected number L1 of bits that implement the first ECDC procedure for the original J-bit stream, to form a (j+K1+L1)-bit stream;

augmenting the (j+K1+L1)-bit stream with a selected number K2 of additional bits that serve as error check bits for a second ECDC procedure, applied to the (K1+L1)-bit stream;

assigning bit values to the K2 additional bits by applying the second ECDC procedure to the (K1+L1)-bit stream;

inserting the K2 additional bits and associated bit values at K2 selected positions in the j-bit stream S-h to form a (j+K1+L1+K2)-bit stream;

augmenting the (j+K1+L1+K2)-bit stream by adding a selected number L2 of additional bits that implement the second ECDC procedure, applied to the (K1+L1)-bit stream, to form a (j+K1+L1+K2+L2)-bit stream;

transmitting the (j+K1+L1+K2+L2)-bit stream to a recipient of this bit stream;

verifying the accuracy of the K1+L1 bits of the first ECDC procedure, as received by the recipient, by applying the second ECDC. procedure to these K1+L1 bits;

when an error is discovered in the K1+L1 bits of the first ECDC procedure, using the second ECDC procedure to correct this error;

verifying the accuracy of, or correcting, the j bits of the bit stream S-h, as received by the recipient, by applying the first ECDC procedure to these j bits; and when an error is discovered in the j bits of the original bit stream S-h, using the first ECDC procedure to correct this error; and reassembling the eight bit streams S-h (h=1, 2, ..., 8), as received by the recipient, into a single ordered stream of 8j bits that represents the transmitted software program, as received by the recipient.

10. A method for transmitting and verifying the accuracy of a software program transmitted to a recipient thereof, the method comprising the steps of:

receiving and storing a software program as an ordered sequence of 2j 8-bit bytes, numbered consecutively m=1, 2, ..., 2j;

forming 16 bit streams S-1, S-2, ..., S-16 from the sequence of 16j bits, where bit stream S-h (h=2k-1; k=1, 2, ..., 8) is an ordered sequence that includes bit number h of each of the j odd-numbered 8-bit bytes (h=1, 3, 5, ..., 15), and where bit stream S-h (h=2k; k=1, 2, ..., 8) is an ordered sequence that includes bit number h of each of the j even-numbered 8-bit bytes (h=2, 4, ... 16);

applying the following procedure separately to each of the bit streams S-h (h=1, 2, ..., 16):

receiving and storing a bit stream S-h to be transmitted;

determining the number of bits j in this bit stream;

augmenting the j-bit stream by adding a selected number K1 of additional bits that serve as error check bits for a first ECDC procedure, applied to the original j-bit stream S-h;

assigning bit values to the K1 additional bits by applying the first ECDC procedure to the original j-bit stream S-h;

inserting the K1 additional bits and associated bit values at K1 selected positions in the stream S-h of j bits to form a (j+K1)-bit stream;

augmenting the (j+K1)-bit stream by adding a selected number L1 of bits that implement the first ECDC procedure for the original J-bit stream, to form a (j+K1+L1)-bit stream;

augmenting the (j+K1+L1)-bit stream with a selected number K2 of additional bits that serve as error check bits for a second ECDC procedure, applied to the (K1+L1)-bit stream;

assigning bit values to the K2 additional bits by applying the second ECDC procedure to the (K1+L1)-bit stream;

inserting the K2 additional bits and associated bit values at K2 selected positions in the j-bit stream S-h to form a (j+K1+L1+K2)-bit stream;

augmenting the (j+K1+L1+K2)-bit stream by adding a selected number L2 of additional bits that implement the second ECDC procedure, applied to the (K1+L1)-bit stream, to form a (j+K1+L1+K2+L2)-bit stream;

transmitting the (j+K1+L1+K2+L2)-bit stream to a recipient of this bit stream;

verifying the accuracy of the K1+L1 bits of the first ECDC procedure, as received by the recipient, by applying the second ECDC procedure to these K1+L1 bits;

when an error is discovered in the K1+L1 bits of the first ECDC procedure, using the second ECDC procedure to correct this error;

verifying the accuracy of, or correcting, the j bits of the bit stream S-h, as received by the recipient, by applying the first ECDC procedure to these j bits; and when an error is discovered in the j bits of the original bit stream S-h, using the first ECDC procedure to correct this error; and reassembling the 16 bit streams S-h (h=1, 2, ..., 16), as received by the recipient, into a single ordered stream of 16j bits that represents the transmitted software program, as received by the recipient.

* * * * *